(12) United States Patent
Dom

(10) Patent No.: US 7,059,619 B2
(45) Date of Patent: Jun. 13, 2006

(54) SINGLE WHEEL STEERING AND SUSPENSION SYSTEM

(76) Inventor: Thomas G. Dom, 6869 E. Vernon Ave., Scottsdale, AZ (US) 85257

( * ) Notice: Subject to any disclaimer, the term of this patent is extended or adjusted under 35 U.S.C. 154(b) by 116 days.

(21) Appl. No.: 10/692,102

(22) Filed: Oct. 23, 2003

(65) Prior Publication Data
US 2004/0124603 A1 Jul. 1, 2004

Related U.S. Application Data

(60) Provisional application No. 60/421,002, filed on Oct. 25, 2002.

(51) Int. Cl.
*B62K 25/00* (2006.01)
(52) U.S. Cl. .................. 280/276; 180/219; 280/279
(58) Field of Classification Search ................ 280/263, 280/270, 272, 274–276, 279, 283, 288.1, 280/293; 180/218, 219
See application file for complete search history.

(56) References Cited

U.S. PATENT DOCUMENTS

| | | | | |
|---|---|---|---|---|
| 833,651 | A * | 10/1906 | Tooley | 280/274 |
| 1,743,121 | A * | 1/1930 | Edele | 280/263 |
| 4,353,567 | A * | 10/1982 | Weldy | 280/270 |
| 4,388,978 | A * | 6/1983 | Fior | 280/275 |
| 4,480,847 | A * | 11/1984 | Oyama | 280/270 |
| 4,867,467 | A * | 9/1989 | Huidekoper | 280/276 |
| 5,249,650 | A * | 10/1993 | Tanaka | 280/276 |
| 5,361,864 | A * | 11/1994 | Tanaka | 280/276 |
| 6,042,134 | A * | 3/2000 | Rector | 280/288.1 |

* cited by examiner

*Primary Examiner*—Lesley D. Morris
*Assistant Examiner*—Matthew Luby

(57) ABSTRACT

A steering and suspension system for bicycles and motorcycles that consists of an axle that is pivotally attached to the forward ends of two side rails that are postioned along each side of the vehicle wheel. The rearward ends of the side rails are pivotally attached to the ends of a rear rail that is paralled to the axle and positioned at the rear of the vehicle wheel. The length of the rear rail is large enough to allow sufficient clearance between the vehicle wheel and the side rails during a turn so that an acceptable steering lock is achieved. When viewed from the top, the system forms an isosceles trapezoid with pivots at each corner. The axes of all four pivots are parallel to each other and perpendicular to the axle axis. This restricts movement of the axle and side rails in a plane that is perpendicular to the plane of rotation of the wheel. The vehicle wheel is controlled by applying a longitudinal force to the axle through conventional control rods and ball joints. Suspension of the wheel is accomplished by pivotally attaching the rear rail to the vehicle frame. The axis of the pivot is parallel to the centerline of the rear rail and perpendicular to the longitudinal centerline of the vehicle. This allows the side rails and axle to move in a plane that is parallel to the plane of rotation of the wheel in the same manner as a conventional rear swingarm suspension. Control of the suspension is achieved by a conventional coil-over-shock unit acting through a progressive rate linkage to a lever rigidly attached to the rear rail.

4 Claims, 5 Drawing Sheets

Top View

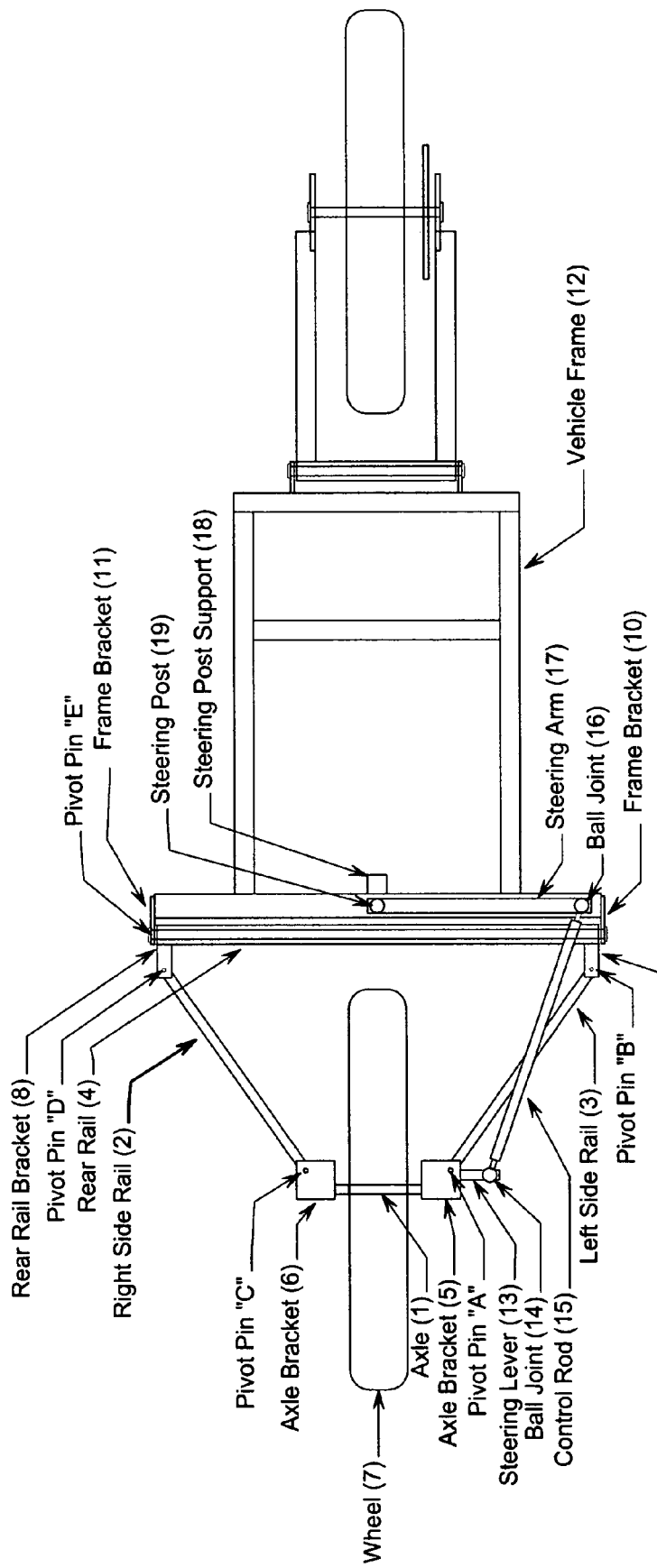
Figure 1 - Top View

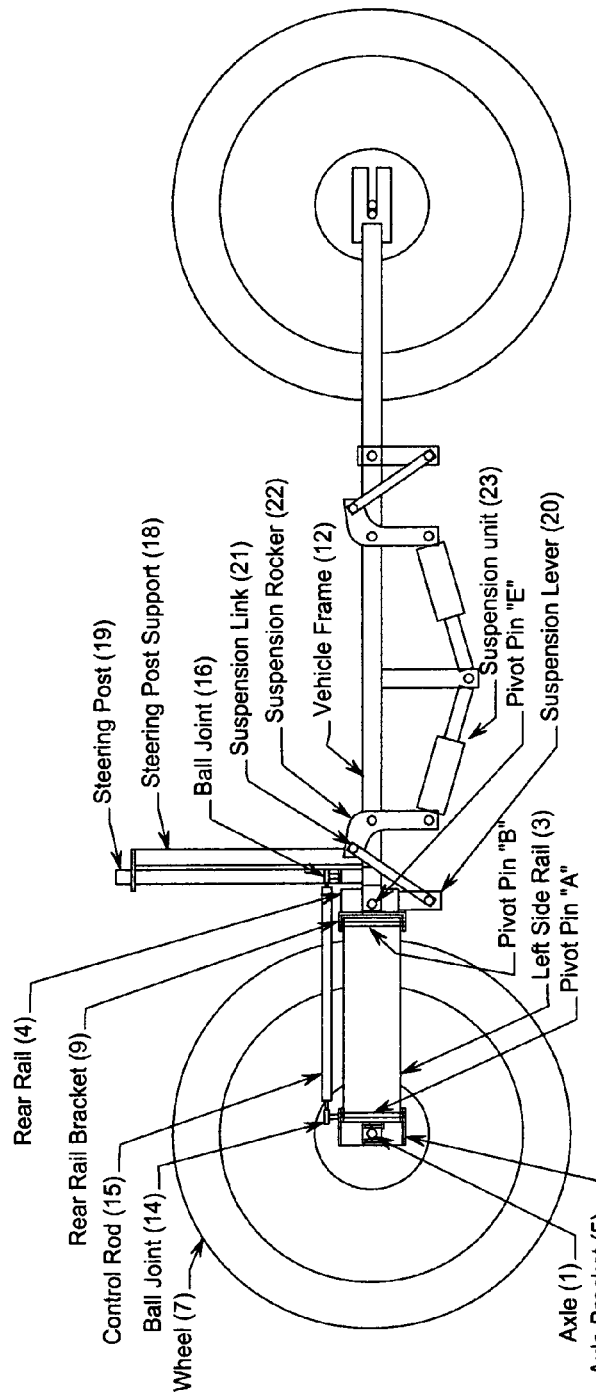
FIGURE 2 - SIDE VIEW

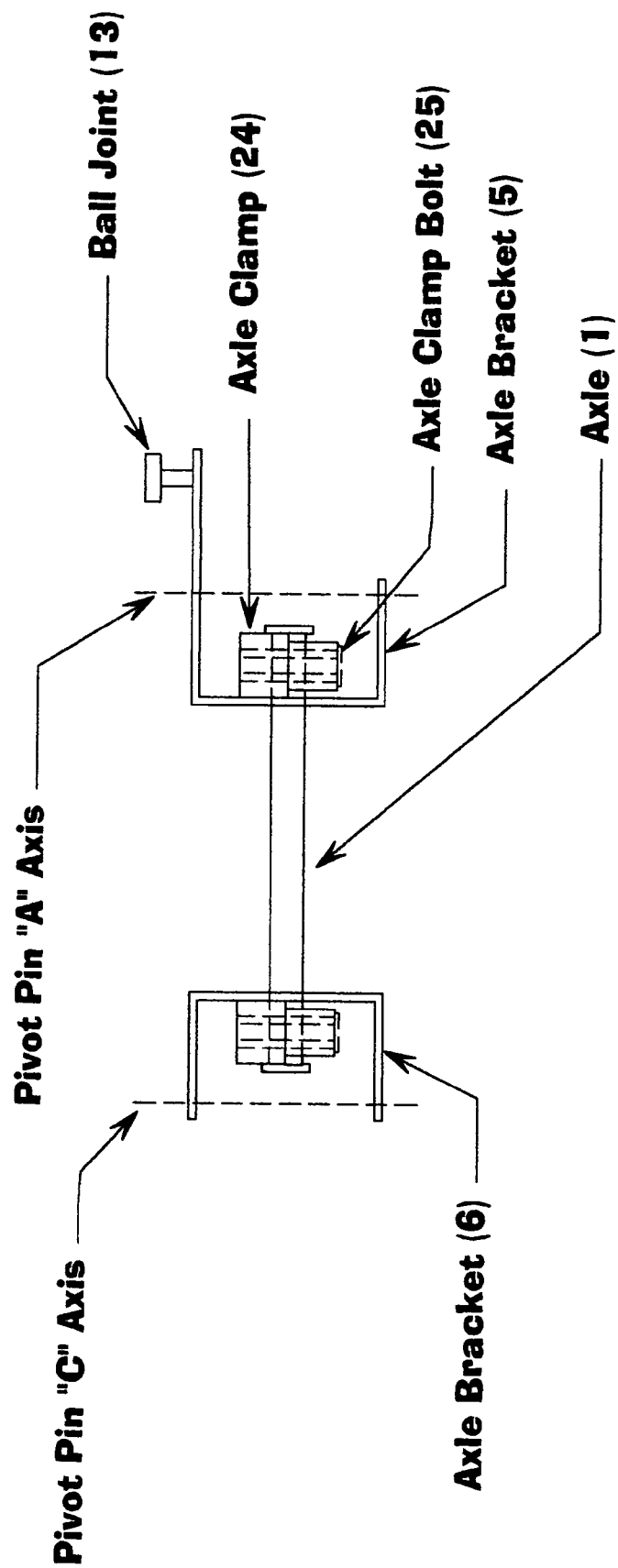
Figure 3 - End View of Axle and Axle Brackets

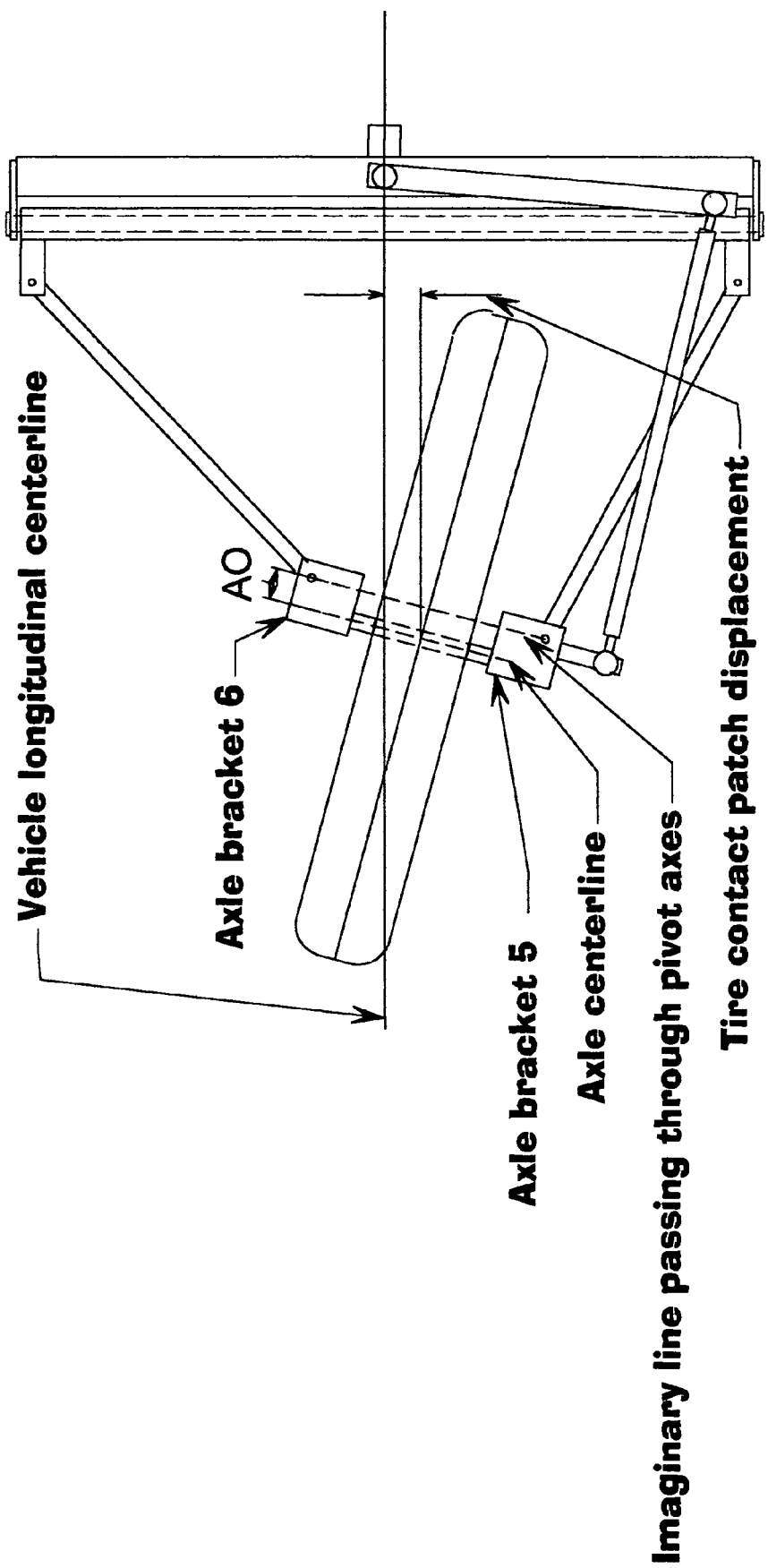
Figure 4. Top View During Turn With Small Axle Offset

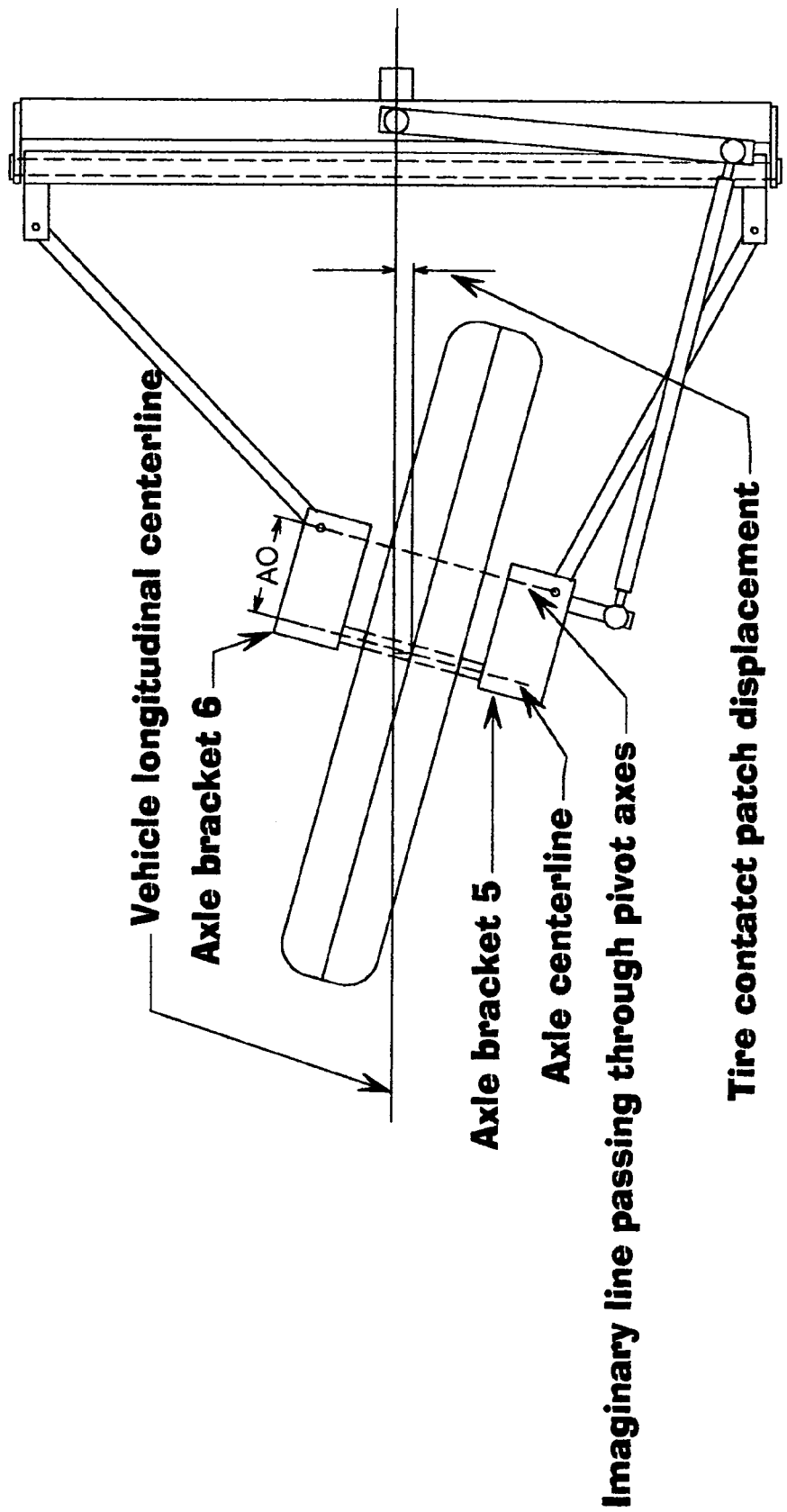
Figure 5. Top View During Turn With Large Axle Offset

SINGLE WHEEL STEERING AND SUSPENSION SYSTEM

CROSS-REFERENCES TO RELATED APPLICATIONS

Inventor claims benefit of filing date of application No. 60/421,002 dated Oct. 25, 2002

BACKGROUND OF THE INVENTION

The most common steering and suspension system used on bicycles and motorcycles is the telescopic fork. That design places high loads on the frame resulting in a heavy frame with a high center of gravity. Other disadvantages of that design include high manufacturing cost, high maintenance, high unsprung weight, and excessive road vibrations transferred to the rider's arms. Additionally, complex antidive systems are required to eliminate suspension compression during braking.

Many designs have been proposed in an attempt to alleviate or mitigate these shortcomings. The referenced patents disclose additional designs that are the most applicable to this invention. Some of these designs have been used successfully on racing motorcycles in the past and have demonstrated superior handling characteristics compared to the telescopic fork. They have not made it to the mass production market for one or more of the following reasons; high manufacturing cost, high steering inertia, high unsprung weight, poor later stiffness, poor torsional stiffness, and limited steering lock. The invention disclosed herein does not possess these disadvantages.

SUMMARY OF THE INVENTION

The steering and suspension system disclosed in this application consists of four major components; a wheel axle, two side rails, and a rear rail. The side rails are equal in length and positioned along each side of the wheel of the vehicle which is rotatably mounted on the axle. The rear rail is significantly longer than the axle and is positioned so that its centerline is perpendicular to the longitudinal axis of the vehicle (therefore parallel to the axle when the vehicle wheel is in the straight position). The rear rail is spaced rearward from the axle a distance equal to the radius of the vehicle wheel plus a small amount for clearance. The forward end of each side rail is pivotally attached to each end of the axle. The rear end of each side rail is pivotally attached to each end of the rear rail. Thus in the top view with the axle in the straight position, the system forms an isosceles trapezoid, with the axle representing the top, the side rails representing the sides, and the rear rail representing the base. At each of the four corners are the pivots whose axes are parallel to each other and only allow movement in a plane that is perpendicular to the plane of rotation of the wheel.

A turn is performed by applying a fore or aft force to a lever attached to one end of the axle. Conventional control rods with ball joints are used to apply the force. This will cause the wheel axle to rotate about the forward pivots of the side rails which in turn causes the side rails to pivot about their rear pivots.

In order to give the vehicle wheel suspension movement, the rear rail is pivoted about an axis that is perpendicular to the vehicle longitudinal axis and lies a horizontal plane. For simplicity, the pivot axis is chosen to be coaxial with the centerline of the rear rail although other arrangements are possible. This pivot is attached to brackets fixed to the vehicle frame. A standard suspension unit (a coil-over-shock unit for example) is connected to the rear rail through a rocker-type progressive rate linkage. This allows the forward ends of the side rails and the axle to move vertically in an arc in the same manner as a typical rear swing arm suspension.

BRIEF DESCRIPTION OF THE DRAWINGS

FIG. 1 is a top view of the steering system with the common suspension parts omitted for clarity.

FIG. 2 is a side view of the steering and suspension system.

FIG. 3 is an end view of the axle and axle brackets.

FIG. 4 is a top view of the steering system during a turn with a small value for the axle offset design parameter.

FIG. 5 is a top view of the steering system during a turn with a large value for the axle offset design parameter.

DETAILED DESCRIPTION OF THE DRAWINGS

Referring to FIG. 1, the axle 1 is rigidly connected to the axle brackets 5 and 6. The axle brackets 5 and 6 are pivotally connected to the forward ends of side rails 2 and 3 through the pivot pins A and C. The rearward ends of rails 2 and 3 are pivotally connected to the rear rail brackets 8 and 9 through the pivot pins B and D. The rear rail brackets 8 and 9 are rigidly attached to the rear rail 4. The rear rail 4 is pivotally connected to frame brackets 10 and 1 through pivot pin E. Frame brackets 10 and 11 are rigidly attached to the vehicle frame 12.

Control of the wheel 7 is performed by applying a torque to the steering post 19 through any convenient method such as handlebars (not shown). The steering post is rotatably attached to the vehicle frame 12 through the steering post support 18. The torque of the steering post 19 is converted to a fore/aft force by the steering arm 17. This force is transmitted to the axle bracket 5 through the ball joint 16, the control rod 15, the ball joint 14, and the steering lever 13. The force causes the axle 1 and axle brackets 5 and 6 to rotate about pivot pins A and C. This causes the side rails 2 and 3 to rotate about pivot pins B and D.

FIG. 2 shows the details of the suspension system. Concentrating on the left side, the rear rail 4 rotates about the pivot pin E along its centerline. Since the rear rail bracket 9 is rigidly attached to the rear rail 4, the bracket also rotates about pin E in the same manner. The left side rail 3 also rotates about pin E through the rear rail bracket 9 because pivot pin B is perpendicular to pivot pin E. This allows the axle bracket 5 and axle 1 to rotate about pivot pin E since pivot pin A is also perpendicular to pin E. Therefore, wheel 7 will move in an arc about pivot pin E. The movement of the wheel 7 is controlled by the suspension unit 23 through the suspension rocker 22, the suspension link 21, and the suspension lever 20 which is rigidly attached to the rear rail 4.

FIG. 3 shows a design that rigidly attaches the axle to the axle brackets. The axle clamps 24 are split into an upper and lower half along the centerline of the axle. The upper half is rigidly attached to the brackets and the lower half secures the axle to the upper half through the bolts 25. This clamping design was chosen because it is similar that used on existing front fork systems and therefore a standard axle and wheel can be used. Other designs are possible and the steering system disclosed herein is not restricted to any particular axle or bracket design.

There are a number of design parameters of this steering system that affect the handling characteristics and stability of a two wheeled vehicle. Fortunately, the vehicle stability is relatively insensitive to most of these parameters and a complete discussion of all of the parameters is not necessary. However, it has been discovered that one of the parameters has a very strong influence on stability and therefore a discussion of that parameter is warranted.

When the steering system disclosed in this application is in a turn, the center of the axle (and therefore the tire contact patch) shifts laterally away from the longitudinal centerline of the vehicle. The magnitude and direction of this displacement is critical to the stability of the vehicle and is strongly influenced by the longitudinal placement of the axle relative to the axes of the pivots that are attached to its ends. This distance between the axle centerline and an imaginary parallel line passing through the axes of the pivots is termed the Axle Offset (positive defined as forward of the imaginary line). FIGS. 4 and 5 show the axle offset design parameter (shown as AO) and its effect on the lateral displacement of the tire contact patch during a turn. For the two cases shown, all other design parameters are equal and both are in a 15-degree turn. From the two figures it is evident that the axle offset should be kept large to minimize the amount of tire contact patch displacement. However, an excessively large axle offset will result in a tire contact patch that moves in the same direction that the vehicle is turning. The vehicle would then be difficult if not impossible to balance. Alternatively, a small axle offset (or negative value) results in a large tire contact patch displacement during even a small turn. The vehicle would then have overly sensitive handling characteristics. Therefore, there is an acceptable range of values for the axle offset and the actual value used for any particular design must be determined by testing.

I claim:

1. A steering and suspension system for bicycles and motorcycles comprising a wheel rotatably attached to an axle, said axle rigidly attached to axle brackets at each end of said axle, said axle brackets containing forward pivots pins, said forward pivot pins arranged with axes that are perpendicular to the centerline of said axle, side rails positioned along each side of said wheel, said side rails attached pivotally at the forward end to said axle brackets through said forward pivot pins with axes of said forward pivot pins perpendicular to longitudinal centerline of said side rails, said side rails attached pivotally at the rear end to rear rail brackets, said rear rail brackets containing rear pivot pins, said forward pivot pin having axes parallel to said rear pivot pin axes so that movement of said side rails and said axle is in a plane that is perpendicular to the plane of rotation of said wheel, said rear rail brackets rigidly attached to each end of a rear rail, said rear rail positioned behind said wheel and perpendicular to the vehicle longitudinal centerline, said rear rail pivoted about a rear rail pivot pin whose axis is perpendicular to the vehicle longitudinal centerline and lies in a horizontal plane, said rear rail pivot pin attached pivotally at each end to frame brackets, said frame brackets rigidly attached to vehicle frame, weight of said bicycle or motorcycle is transmitted through said rear rail pivot pin to said rear rail, through said rear rail to said rear rail brackets, through said rear rail brackets to said rear pivot pins, through said rear pivot pins to said side rails, through said side rails to said forward pivot pins, through said forward pivot pins to said axle brackets, through said axle brackets to said axle.

2. The steering and suspension system of claim 1 wherein steering control of said wheel is performed by applying a force in the longitudinal direction to said axle, said force originating from a vehicle operator who applies a torque to a vertical steering post through conventional handlebars, said steering post rotatably attached to said vehicle frame and located along the centerline of said vehicle frame, a steering arm rigidly attached to said steering post and extending outward laterally from said steering post thereby converting said torque into a longitudinal force, said longitudinal force transmitted forward by means of a control rod, a rear end of said control rod connected to said steering arm by means of a ball joint, a forward end of said control rod connected to a steering lever by means of a ball joint, said steering lever rigidly attached to one of said axle brackets which is located on same side of vehicle centerline as that of said steering arm.

3. The steering and suspension system of claim 1 wherein suspension control of said wheel is performed by a coil-over-shock unit acting on the lower end of a suspension rocker, said suspension rocker pivotally attached to said vehicle frame through a pivot pin which has an axis that is parallel to axis of said rear rail pivot pin, an upper end of said suspension rocker pivotally connected to the upper end of a suspension link, a lower end of said suspension link pivotally connected to a suspension lever, said suspension lever rigidly attached to said rear rail.

4. The steering and suspension system of claim 1 wherein the longitudinal position of the centerline of said axle relative to an imaginary line connecting the axes of said forward pivot pins is chosen to reduce the lateral displacement of the tire contact patch during a turn.

* * * * *